July 3, 1928.

S. D. RICH ET AL 1,675,767

HEADLIGHT ATTACHMENT

Filed Dec. 31, 1927

Inventor
Sam D. Rich, and
Minnie D. Rich.

By Eccleston & Eccleston,
Attorneys

Patented July 3, 1928.

1,675,767

UNITED STATES PATENT OFFICE.

SAM D. RICH AND MINNIE D. RICH, OF COLUMBUS, OHIO.

HEADLIGHT ATTACHMENT.

Application filed December 31, 1927. Serial No. 244,013.

This invention relates to attachments for headlights of locomotives, automobiles, motorcycles and the like, and has for its primary object to so modify the light rays emitted from the headlight as to cause them to penetrate fogs, mists and the like, thereby permitting the operation of such vehicles irrespective of weather conditions.

Another object of the invention resides in the provision of an attachment as described which will diffuse the light rays projected from the headlight to the sides and center of the road, and thus relieve eye strain which is ordinarily caused by the glare of headlights during long periods of night driving.

A further object of the invention consists in the design of an attachment for headlights which will obviate the necessity of lens now in use and permit the use of plain glass discs in lieu thereof.

Other objects and advantages of the invention will be apparent from the following description when taken in connection with the accompanying drawings; in which Figure 1 is a fragmentary front elevation of an automobile showing our attachment in place on the headlights thereof.

Figure 1:
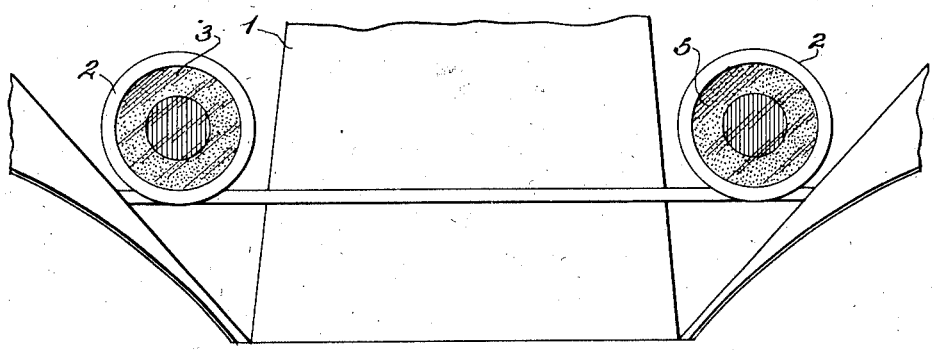

Referring to the drawings in greater detail the numeral 1 designates an automobile of any conventional type provided with the headlights 2 and with which our improved attachment 3 is associated. It is to be distinctly understood, however, that while the invention is shown herein as specifically applied to the headlights of an automobile, the same is equally well adapted for use in connection with headlights of motorcycles, locomotives, and in fact, any other vehicles on which headlights are employed.

Figure 2:
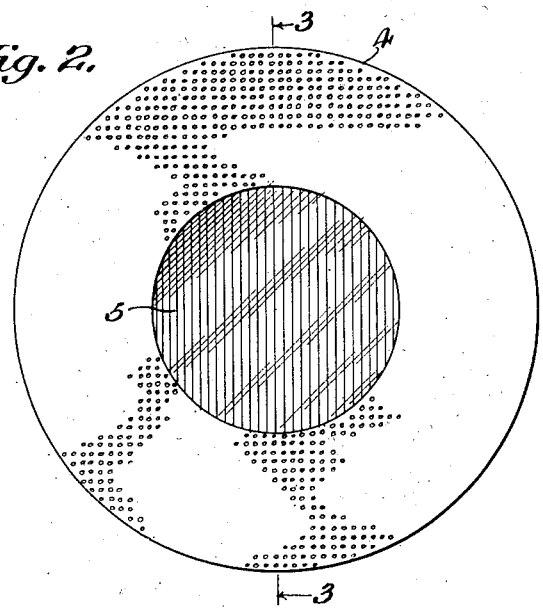
Figure 2 is an enlarged plan view of the attachment per se.
Figure 3:
Figure 3 is a vertical section taken on line 3—3 of Fig. 2.

The attachment 3 as shown in Figures 1, 2 and 3, comprises an annular screen or member 4 of foraminous material, preferably sheet metal, and a central disc 5 of translucent material which is preferably colored red. This attachment may be placed either in front of or behind the conventional headlight lens. It is preferable, however, to place the attachment behind the lens and within the headlight.

In the specific embodiment shown in Figures 1, 2 and 3 the annular member 4 is provided with a plurality of minute perforations, which diffuses the outer band of reflected light from the headlight, and the member 5 is a disc of mica which is colored red. The rays of light, therefore, passing through this central disc will transmit a red beam of light which will soften the glare which would otherwise be given off by the headlight. The combined light given off by headlights provided by the present attachment will therefore comprise an annular beam of white light which is softened by the central beam of red light transmitted through the red mica disc 5. Such a combined beam will penetrate fogs, mists and the like, and therefore greatly facilitate the operation of automobiles and other vehicles in inclement weather. Moreover, a headlight provided with the present attachment will give a more definite warning to approaching vehicles, because the red beam of light will more readily attract the attention of operators of approaching vehicles.

While the annular screen 4 has been described as formed of perforated sheet metal, it will be apparent to those skilled in the art that the invention is not so limited, as an annual member of different material may be employed, provided it is sufficiently translucent to permit the transmission of an annular band of white light. Furthermore, while the disc 5 has been described as formed of red mica it is to be understood that the same may be constructed of a sheet of red fabric or other translucent material which will transmit a beam of red light to be associated with the annular band of white light.

Moreover, where found desirable the projected light may be further softened by coloring that portion of the annular member 4 above the disc 5 a light blue, green, yellow, or salmon color.

Figure 4:
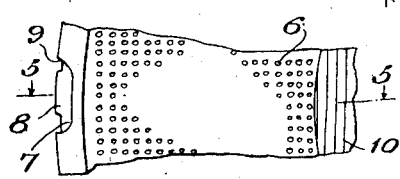
Figure 4 is a detail view of a modified construction showing the means by which the foraminous screens may be relatively adjusted.
Figure 5:
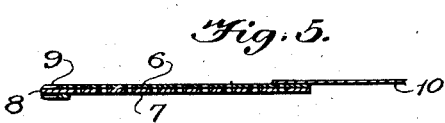
Figure 5 is a sectional view taken on line 5—5 of Fig. 4.

In the modified construction shown in Figures 4 and 5 we have provided means by which the intensity of the annular band of white light may be decreased or entirely eliminated where desired. In this construction of the invention two annular members 6 and 7 of foraminous material are provided which are substantially identical with the member 4 previously described. In this modified form the annular member 7 is provided with a projection 8 which extends into a notched portion 9 of the disc 6 thereby permitting a relative adjustment of these two members, so as to bring the perforations thereof into or out of registration. It will be obvious that the intensity of the white light transmitted through the attachment may be varied to any desired extent, depending upon the relative positions of these two annular members and the perforations formed therein. This construction is, of course, also used in conjunction with a central red disc 10 just as in the form previously described.

In the operation of the device as depicted in Figures 1, 2 and 3, a central beam of red light will be transmitted through the screen and will be surrounded by an annular band of white light. This central beam of red light will materially reduce the glare from the headlight and will also penetrate fogs, thus greatly increasing the amount of visibility for the operator of the vehicle and also more definitely indicating the presence of a vehicle to the driver of an approaching vehicle. Also the annular band of white light which is more or less diffused by its passage through the annular screen, is softened by the beam of red light and thus tends to reduce the amount of glare to a minimum, thereby practically eliminating eye strain during night driving. Furthermore, it will be apparent that the light as thus blended is sufficient to adequately light the road and yet is not sufficiently blinding and glaring to require the use of dimmers to avoid blinding the operators of approaching vehicles.

The operation of the modified form of the invention shown in Figures 4 and 5 is identical with that described in connection with Figures 1, 2 and 3, except that the intensity of the annular beam of white light may be varied from a maximum to a complete elimination thereof, as required according to circumstances. To make this adjustment it is only necessary that the attachment be removed from the headlight and the finger engaging portion or projection 8 of the member 7 given a slight movement to bring the perforations of the two members 6 and 7 into or out of registration to permit a varying amount of light to be transmitted through the perforations or to be shut off entirely. Of course, after the adjustment is made, the attachment is again applied to the headlight either in front of or behind the lens, as found desirable.

In accordance with the patent statutes we have described what we now believe to be the best embodiment of our invention, but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. A unitary attachment for headlights including a unitary annular member of foraminous material having a diameter of substantially the diameter of the headlight, and a colored disc of translucent material concentrically arranged with respect to said annular member and attached thereto.

2. An attachment for headlights including two superposed annular members of foraminous material, means for relatively adjusting said members circumferentially to render said members opaque, and a colored disc of translucent material concentrically arranged with respect to said annular members.

SAM D. RICH.
MINNIE D. RICH.